United States Patent Office 3,169,097
Patented Feb. 9, 1965

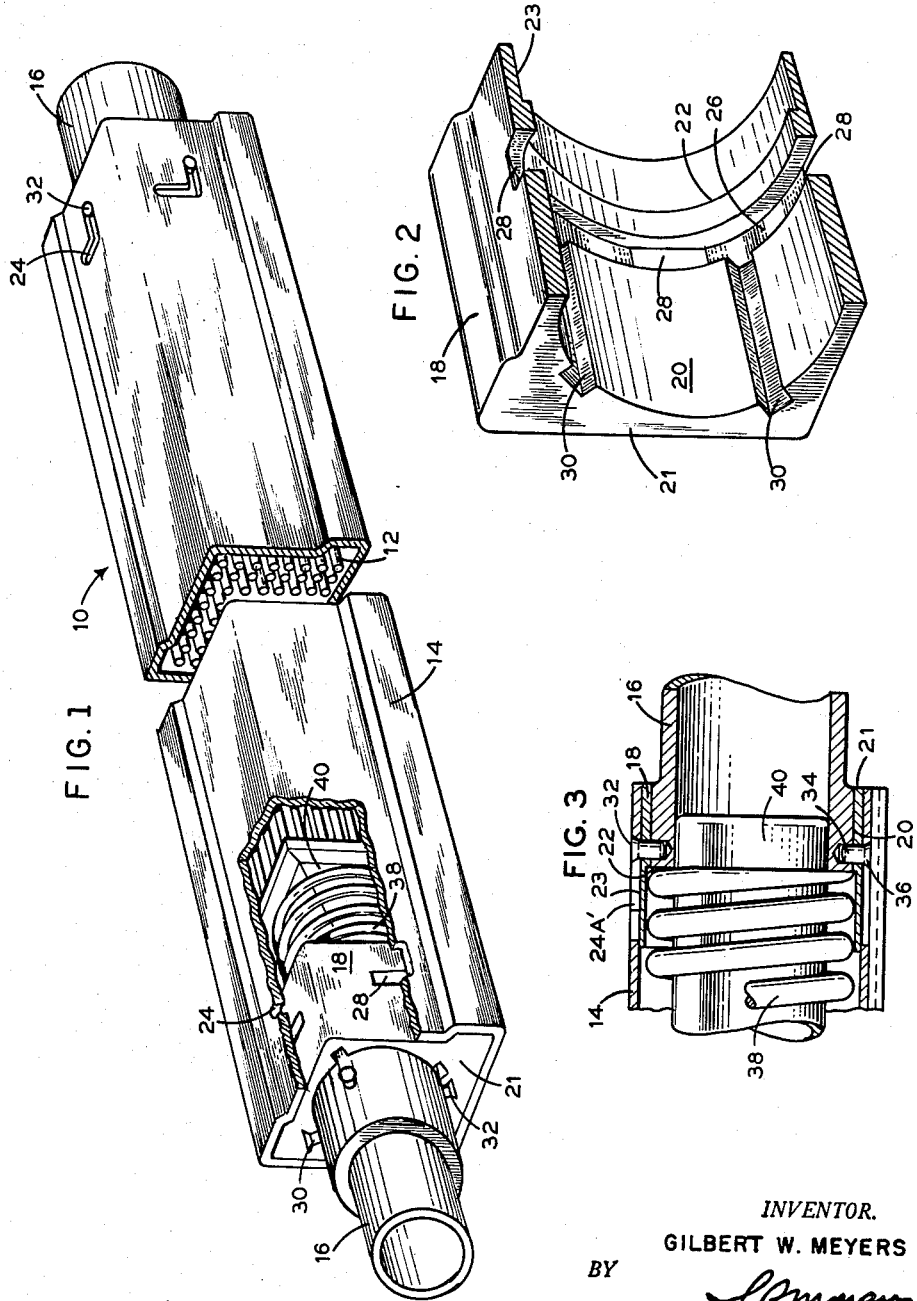

3,169,097
FUEL ELEMENT END CLOSURE ASSEMBLY
Gilbert W. Meyers, Lynchburg, Va., assignor to The Babcock & Wilcox Company, New York, N.Y., a corporation of New Jersey
Filed Mar. 25, 1959, Ser. No. 801,906
11 Claims. (Cl. 176—79)

This invention relates in general to a fuel element as used in a nuclear reactor and more specifically, it relates to a new and improved end closure for a fuel element container.

In a fuel element as used in a nuclear reactor the fissionable material, or the fuel as it is usually called, is assembled into uniformly shaped fuel containing components. It is within these components that the heat from a nuclear chain reaction is generated. A coolant in turn flows over the components absorbing heat generated in the chain reaction so that it may be converted into a usable form. These fuel containing components are generally situated within a fuel element container which defines the collant flow channel through the components, each container having one or more of these fuel containing components located therein.

The present invention is concerned with providing an end closure for these fuel element containers. In most cases it is advantageous to have the fuel elements formed other than circular in cross section in order to utilize the space within the reactor most efficiently, while at the same time it is desirable from both the economic and strength viewpoints to have circular inlet and outlet nozzles for the fuel elements. Since it is also preferable to have as little metal volume as possible in the core of a nuclear reactor to minimize the amount of unproductive neutron absorption, the fuel element container is constructed of light gage metal. While the fuel containing components assist in supporting the metal walls of the container, the end portions of the container, which extend beyond the fuel components, require other support means.

In the past, end adaptors have been integrally attached to the fuel element containers by riveting or welding so that replacement of the fuel containing components, after depletion of the fuel contained therein, entailed a costly machining operation and frequently necessitated replacement of the container itself.

Accordingly, the present invention provides an end closure having a hollow reinforcing member located within and at the extremities of the fuel element container. A nozzle is positioned within the reinforcing member and is removably attached to both the reinforcing member and the fuel element container.

Further, this end closure provides a tight fitting assembly that limits the coolant leakage from the sides of the fuel element container.

Also, this invention provides a reinforcement to the end of the fuel element container which does not become an integral part of the container making it possible to remove this reinforcement without damaging the container.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:

FIG. 1 is an isometric view of a nuclear fuel element with partial cut-outs illustrating the present invention, with one nozzle partially removed therefrom;

FIG. 2 is an isometric sectional view of the reinforcing member of the present invention;

FIG. 3 is a partial cross section of the end closure assembly within the end of the fuel element container.

A typical example of a reactor system in which the fuel element end closure of the present invention could be used is to be found in the copending application of the common assignee Serial No. 712,512 of Melvin F. Sankovich, filed January 31, 1958. This copending application reveals a fuel element generally similar in size and shape to the one illustrated in FIG. 1. The fuel element is normally positioned within a reactor between upper and lower grid plates (not shown) as illustrated in the above cited copending application.

In FIG. 1 there is shown a nuclear fuel element 10 having a fuel containing bundle 12 positioned in the generally rectangular tubular fuel element container 14. The end closure for the fuel element container 14 is composed basically of a cylindrical nozzle 16 and a hollow reinforcing member 18 which in combination are the essence of the present invention. The term "hollow reinforcing member" in this specification is defined as a member whose polygonal outer surface is generally rectangular and whose curvilinear inner surface is preferably circular.

The reinforcing member 18 may be a casting which is machine finished or may be entirely machined from a piece of metal stock. The outer surface of this reinforcing member is shaped to closely conform to the inner surface of the fuel element container 14. The inner surface 20 of the reinforcing member 18 (see FIG. 2) is cylindrical and concentric with the longitudinal axis of the fuel element container 14. This inner cylindrical surface 20 extends from the outer face 21 of the reinforcing member to a position near the inner face, where it terminates at a bearing surface 22, the purpose of which will be described below. The portion of the reinforcing member that extends beyond the bearing surface 22 forms a skirt 23 which performs the function of sealing off the holes 24 in the fuel element container 14 and will be more fully described hereinbelow.

The diameter of the cylindrical internal surface 20 is of such a size relative to the overall size of the reinforcing member 18 as to provide the member with relatively thin sides. A circumferential groove 26 rectangular in cross section extending within the internal surface 20 produces openings 28 where it intersects the outer surface of the reinforcing member. Axial slots 30 are also provided in the internal surface 20 extending from the outer face 21 of the reinforcing member to the circumferential groove 26. These axial slots 30 are located at the corners of the reinforcing member 18 where the wall thickness is the geratest and are of the same depth as the circumferential groove 26. The purpose of these axial slots 30 is to permit the insertion and passage of pins 32, which are attached to the nozzle 16, into the circumferential groove 26.

The nozzle 16 is cylindrical in shape and proportioned to fit snugly in the reinforcing member 18. The pins 32 are integrally attached to the outer surface of the nozzle 16 at positions near its base and extend radially outward therefrom. The distance of the pins 32 from the base of the nozzle 16 is such that when the pins are located in the circumferential groove 26 of the reinforcing member 18, the base of the nozzle is aligned with the bearing surface 22 of the reinforcing member. The pins 32 are proportioned to slide in the axial slots 30 and the circumferential groove 26 and when the nozzle 16 is rotated, emerge through the openings 28 in the reinforcing member 18 to engage the sides of the fuel elements container 14. Further, these pins 32 have a shaft 34 of uniform cross section and an outer end portion 36 of uniformly outwardly diverging cross section as shown in FIG. 3, so as to assure positive engagement of the fuel element container when the pins are properly positioned.

There are some fuel element constructions where the end closure does not have to be in positive engagement with the fuel element container. In such cases, the pins 32 would be of a uniform circular cross section throughout their length.

The fuel element container 14 is provided with an L-shaped hole 24 in each side thereof with the vertical leg of the L-shaped hole aligned with the longitudinal axis of the fuel element and positioned between the horizontal leg of the hole and the near end of the container. These holes 24 are in registry with the openings 28 of the reinforcing member 18 to receive the pins 32 when the nozzle 16 is rotated so that the pins extend through the apertures 28 and 24. The vertical leg 24A of the L-shaped hole have inwardly converging surfaces 24A' to mate with the outer end portion of the pins 32 to connect the closure assembly and the fuel element container 14, with the container wall being held firmly to the closure assembly. The lower portion of these inwardly converging surfaces are tapered forming a lead in surface to permit the entry of the pins into the vertical leg 24A which would not otherwise be possible if the container wall was bowed away from the reinforcing member 18.

As the reinforcing member 18 is inserted into the fuel element container 14, the bearing surface 22 seats upon the outer end of the fuel element bundle compression spring 38 with the skirt 23 of the reinforcing member 18 fitting around the outside of the spring. The purpose of the spring 38 is to provide a hold-down force on the fuel containing bundles 12 to act against the hydraulic forces of the coolant flowing therethrough. Further, this spring 38 holds the fuel containing bundles 12 in place while allowing for differential thermal expansion between the bundles 12 and the fuel element container 14. The nozzle 16 is then inserted into the reinforcing member 18 with the pins 32 sliding in the axial slots 30 therein. As the pins 32 approach the circumferential groove 26, the nozzle fits snugly over the outer end of the flow transition piece 40. This flow transition piece bears on the outer end of the fuel containing bundle 12, fits up through the compression spring 38, and forms a transition from a generally rectangular to a circular fluid flow path.

When the pins 32 reach the end of the axial slots 30 and enter the circumferential groove 26, the base of the nozzle 16 is simultaneously aligned with the bearing surface 22 of the reinforcing member 18 and also seats upon the outer end of the fuel bundle compression spring 38. Upon the entry of the pins 32 into the circumferential groove 26, an axial force is applied to the nozzle and reinforcing member assembly which compresses the spring 38 until the openings 28 in the reinforcing member 18 are aligned with the horizontal leg of the L-shaped holes 24 in the fuel element container 14. The nozzle 16 is then rotated within the reinforcing member 18 until the pins 32 emerge through the openings 28 and the L-shaped holes 24 and are aligned with the vertical leg of the L-shaped holes 24. Upon release of the aforesaid axial force the spring 38 is released, moving the nozzle and reinforcing member assembly outward and moving the pins 32 into the vertical leg of the L-shaped holes 24 to positively attach the nozzle and reinforcing member assembly to the end of the fuel element container. The nozzle and reinforcing member may then be removed by reversing the above described steps.

While in accordance with the provisions of the statutes I have illustrated and described herein the best form and more of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In a fuel element having a rectangular tubular container, an end closure assembly for said container comprising a hollow reinforcing member removably located within and at the extremity of said container, said reinforcing member having an outer surface of a shape which conforms to the internal surface of said rectangular tubular container and having a cylindrical internal surface concentric with the longitudinal axis of said tubular container, openings through said reinforcing member, a cylindrical nozzle removably positioned within said reinforcing member, and means adapted to removably attach said cylindrical nozzle to said container through said openings in said reinforcing member.

2. In a fuel element having a rectangular tubular container, an end closure assembly for said container comprising a hollow reinforcing member removably located within and at the extremity of said container, said reinforcing member having an outer surface of a shape which conforms to the internal surface of said tubular container and having a cylindrical internal surface concentric with the longitudinal axis of said tubular container, a circumferential slot in said internal surface of said reinforcing member, said slot of a depth to provide openings through the thinnest wall sections of said reinforcing member, a cylindrical nozzle removably positioned within said reinforcing member, and means adapted to removably attach said cylindrical nozzle to said container through said openings in said reinforcing member.

3. In a fuel element having a rectangular tubular container, said container having an elongated hole in each side thereof, an end closure assembly for said container comprising a hollow reinforcing member removably located within and at the extremity of said tubular container, said reinforcing member having an outer surface of a shape which conforms to and is adapted to snugly fit within said tubular container and having a cylindrical internal surface concentric with the longitudinal axis of said tubular container, a circumferential slot in said internal surface of said reinforcing member of a depth to provide openings through the thinnest wall sections of said reinforcing member in alignment with said elongated holes in said tubular container, a cylindrical nozzle removably positioned within said reinforcing member, and pins of a length not less than the thinnest wall section of said reinforcing member adapted to pass through said openings in said reinforcing member and said openings in the sides of said container to removably attach said nozzle to said tubular container.

4. In a fuel element having a rectangular tubular container, said container having an elongated hole in each side thereof, an end closure assembly for said container comprising a hollow reinforcing member removably located within and at the extremity of said tubular container, said reinforcing member having an outer surface of a shape which conforms to and is adapted to snugly fit within said tubular container and having a cylindrical internal surface concentric with the longitudinal axis of said tubular container, a circumferential slot in said internal surface of said reinforcing member of a depth to provide openings through the thinnest wall sections of said reinforcing member in alignment with said elongated holes in said tubular container, axial slots in said internal surface of said reinforcing member at the thickest wall sections thereof extending from one end thereof and terminating at an intersection with said circumferential slot, a cylindrical nozzle removably positioned within said reinforcing member, and pins of a length not less than the thinnest wall section of said reinforcing member adapted to pass through said openings in said reinforcing member and said openings in the sides of said container to removably attach said nozzle to said tubular container.

5. In a fuel element having a rectangular tubular container, said tubular container having an elongated hole in each side thereof, an end closure assembly for said container comprising a hollow reinforcing member removably located within and at the extremity of said tubular container, said reinforcing member having an outer surface of a shape which conforms to and is adapted to snugly fit within said tubular container and having a cylindrical internal surface concentric with the longitudinal axis of said tubular container thereby providing said reinforcing member with a wall section of varying thickness, a circumferential slot in said internal surface of said reinforcing member of a depth to provide openings through the thinnest wall sections of said reinforcing member in alignment with said elongated holes in said tubular container, axial slots in said internal surface of said reinforcing member at the thickest wall sections thereof extending from one end thereof and terminating at an intersection with said circumferential slot, a cylindrical nozzle removably positioned within said reinforcing member, pins attached to and radially extending from the outer surface of said cylindrical nozzle near one end thereof, said pins of a length not less than the thinnest wall section of said reinforcing member and adapted to pass through said openings in said reinforcing member and said openings in the sides of said container to removably attach said nozzle to said tubular container.

6. In a fuel element having a rectangular tubular container, said tubular container having an elongated hole in each side thereof, an end closure assembly for said container comprising a hollow reinforcing member removably located within and at the extremity of said tubular container, said reinforcing member having an outer surface of a shape which conforms to and is adapted to snugly fit within said tubular container and having a cylindrical internal surface concentric with the longitudinal axis of said tubular container thereby providing said reinforcing member with a wall section of verying thickness, a circumferential slot in said internal surface of said reinforcing member of a depth to provide openings through the thinnest wall sections of said reinforcing member in alignment with said elongated holes in said tubular container, axial slots in said internal surface of said reinforcing member at the thickest wall sections thereof extending from one end thereof and terminating at an intersection with said circumferential slot, a cylindrical nozzle removably positioned within said reinforcing member, pins attached to and radially extending from the outer surface of said cylindrical nozzle near one end thereof, said pins of a length not less than the thinnest wall section of said reinforcing member and adapted to slide in said axial slots in said reinforcing member, said pins adapted to pass through said openings in said reinforcing member and said openings in the sides of said container to removably attach said nozzle to said tubular container.

7. In a fuel element having a rectangular tubular container and fuel containing bundles disposed therein, an improvement comprising in each side of said tubular container an L-shaped hole the base of which is at a predetermined distance from the end of said tubular container, the vertical leg of said L-shaped hole aligned with the longitudinal axis of said fuel element and positioned between the horizontal leg of said hole and the near end of said tubular container, a hollow reinforcing member removably located within and at the extremity of said tubular container, said reinforcing member having an outer surface of a shape which conforms to and is adapted to snugly fit within said tubular container and having a cylindrical internal surface concentric with the longitudinal axis of said tubular container thereby providing said reinforcing member with a wall section of varying thickness, a circumferential slot in said internal surface of said reinforcing member of a depth to provide openings through the thinnest wall sections of said reinforcing member, axial slots in said internal surface of said reinforcing member at the thickest wall sections thereof extending from one end thereof and terminating at an intersection with said circumferential slot, a cylindrical nozzle adapted to be removably positioned snugly within said reinforcing member, a resilient means located within said tubular container and positioned between said fuel containing bundles and said reinforcing member and nozzle, pins attached to and radially extending from the outer surface of said cylindrical nozzle near one end thereof, said pins of a length not less than the thinnest wall section of said reinforcing member and adapted to slide in said axial slots whereby upon compression of said resilient means and upon rotation of said nozzle in said reinforcing member said pins pass through the openings in said reinforcing member wall and enter the horizontal leg of said L-shaped holes in said tubular container and upon reaching the vertical leg of said L-shaped holes and upon release of compression of said resilient means the nozzle is removably attached to said tubular container through said reinforcing member.

8. In a fuel element having a rectangular tubular container and fuel containing bundles disposed therein, an improvement comprising in each side of said tubular container an L-shaped hole the base of which is at a predetermined distance from the end of said tubular container, the vertical leg of said L-shaped hole aligned with the longitudinal axis of said fuel element and positioned between the horizontal leg of said hole and the near end of said tubular container, a hollow reinforcing member removably located within and at the extremity of said tubular container, said reinforcing member having an outer surface of a shape which conforms to and is adapted to snugly fit within said tubular container and having a cylindrical internal surface concentric with the longitudinal axis of said tubular container thereby providing said reinforcing member with a wall section of varying thickness, a circumferential slot in said internal surface of said reinforcing member of a depth to provide openings through the thinnest wall sections of said reinforcing member, axial slots in said internal surface of said reinforcing member at the thickest wall sections thereof extending from one end thereof and terminating at an intersection with said circumferential slot, a cylindrical nozzle adapted to be removably positioned snugly within said reinforcing member, a resilient means located within said tubular container and positioned between said fuel containing bundles and said reinforcing member and nozzle, pins attached to and radially extending from the outer surface of said cylindrical nozzle near one end thereof, said pins of a length not less than the thinnest wall section of said reinforcing member and adapted to slide in said axial slots, whereby upon compression of said resilient means and upon rotation of said nozzle in said reinforcing member said pins pass through the openings in said reinforcing member wall and enter the horizontal leg of said L-shaped holes in said tubular container and upon reaching the vertical leg of said L-shaped holes and upon release of compression of said resilient means the nozzle is removably attached to said tubular container though said reinforcing member, and an annular bearing surface in the internal surface of said reinforcing member below said circumferential slot and in conjunction with the bottom of said cylindrical nozzle to form a seat for said resilient means.

9. In a fuel element having a rectangular tubular container and fuel containing bundles disposed therein, an improvement comprising in each side of said tubular container an L-shaped hole the base of which is at a predetermined distance from the end of said tubular container, the vertical leg of said L-shaped hole aligned with the longitudinal axis of said fuel element and positioned between the horizontal leg of said hole and the near end of said tubular container, a hollow reinforcing member removably located within and at the extremity of said tubular container, said reinforcing member having an outer surface of a shape which conforms to and is adapted to snugly fit within said tubular container and having a cylindrical internal surface concentric with the longitudinal axis of said tubular container thereby providing said reinforcing member with a wall section of varying thickness, a circumferential slot in said internal surface of said reinforcing member of a depth to provide openings through the thinnest wall sections of said reinforcing member, axial slots in said internal surface of said reinforcing member at the thickest wall sections thereof extending from one end thereof and terminating at an intersection with said circumferential slot, a cylindrical nozzle adapted to be removably positioned snugly within said reinforcing member, a resilient means located within said tubular container and positioned between said fuel containing bundles and said reinforcing member and nozzle, pins attached to and radially extending from the outer surface of said cylindrical nozzle near one end thereof, said pins of a length not less than the thinnest wall section of said reinforcing member and adapted to slide in said axial slots, whereby upon compression of said resilient means and upon rotation of said nozzle in said reinforcing member said pins pass through the openings in said reinforcing member wall and enter the horizontal leg of said L-shaped holes in said tubular container and upon reaching the vertical leg of said L-shaped holes and upon release of compression of said resilient means the nozzle is removably attached to said tubular container through said reinforcing member, and an annular bearing surface in the internal surface of said reinforcing member below said circumferential slot and in conjunction with the bottom of said cylindrical nozzle to form a seat for said resilient means, said reinforcing member extending below said bearing surface to form a closure for the L-shaped holes in said tubular container.

10. In a fuel element having a rectangular tubular container and fuel containing bundles disposed therein, an improvement comprising in each side of said tubular container an L-shaped hole the base of which is at a predetermined distance from the end of said tubular container, the vertical leg of said L-shaped hole aligned with the longitudinal axis of said fuel element and positioned between the horizontal leg of said hole and the near end of said tubular container, a hollow reinforcing member removably located within and at the extremity of said tubular container, said reinforcing member having an outer surface of a shape which conforms to and is adapted to snugly fit within said tubular container and having a cylindrical internal surface concentric with the longitudinal axis of said tubular container thereby providing said reinforcing member with a wall section of varying thickness, a circumferential slot in said internal surface of said reinforcing member of a depth to provide openings through the thinnest wall sections of said reinforcing member, axial slots in said internal surface of said reinforcing member at the thickest wall sections thereof extending from one end thereof and terminating at an intersection with said circumferential slot, a cylindrical nozzle adapted to be removably positioned snugly within said reinforcing member, a resilient means located within said tubular container and positioned between said fuel containing bundles and said reinforcing member and nozzle, pins attached to and radially extending from the outer surface of said cylindrical nozzle near one end thereof, said pins having a shaft of uniform cross section and an outer end portion of uniformly outwardly diverging cross-section, the vertical legs of said L-shaped holes in said tubular container having inwardly converging surfaces to mate with the outer end portion of said pins, said pins of a length not less than the thinnest wall section of said reinforcing member and adapted to slide in said axial slots of said reinforcing member, whereby upon compression of said resilient means and upon rotation of said nozzle in said reinforcing member said pins pass through the openings in said reinforcing member wall and enter the horizontal leg of said L-shaped holes in said tubular container and upon reaching the vertical leg of said L-shaped holes and upon release of compression of said resilient means the nozzle is removably attached to said tubular container through said reinforcing member, and an annular bearing surface in the internal surface of said reinforcing member below said circumferential slot and in conjunction with the bottom of said cylindrical nozzle to form a seat for said resilient means, said reinforcing member extending below said bearing surface to form a closure for the L-shaped holes in said tubular container.

11. In a fuel element having a rectangular tubular container and fuel containing bundles disposed therein, an improvement comprising in each side of said tubular container an L-shaped hole the base of which is at a predetermined distance from the end of said tubular container, the vertical leg of said L-shaped hole aligned with the longitudinal axis of said fuel element and positioned between the horizontal leg of said hole and the near end of said tubular container, a hollow reinforcing member removably located within and at the extremity of said tubular container, said reinforcing member having an outer surface of a shape which conforms to and is adapted to snugly fit within said tubular container and having a cylindrical internal surface concentric with the longitudinal axis of said tubular container thereby providing said reinforcing member with a wall section of varying thickness, a circumferential slot in said internal surface of said reinforcing member of a depth to provide openings through the thinnest wall sections of said reinforcing member, axial slots in said internal surface of said reinforcing member at the thickest wall sections thereof extending from one end thereof and terminating at an intersection with said circumferential slot, a cylindrical nozzle adapted to be removably positioned snugly within said reinforcing member, a resilient means located within said tubular container and positioned between said fuel containing bundles and said reinforcing member and nozzle, pins attached to and radially extending from the outer surface of said cylindrical nozzle near one end thereof, said pins having a shaft of uniform cross-section and an outer end portion of uniformly outwardly diverging cross-section, the vertical legs of said L-shaped holes in said tubular container having inwardly converging surfaces to mate with the outer end portion of said pins, means provided at the base of the vertical legs of said L-shaped holes to form a lead in surface for said inwardly converging surface, said pins of a length not less than the thinnest wall section of said reinforcing member and adapted to slide in said axial slots of said reinforcing member, whereby upon compression of said resilient means and upon rotation of said nozzle in said reinforcing member said pins pass through the openings in said reinforcing member wall and enter the horizontal leg of said L-shaped holes in said tubular container and upon reaching the vertical leg of said L-shaped holes and upon release of compression of said resilient means the nozzle is removably attached to said tubular container through said reinforcing member, and an annular bearing surface in the internal surface of said reinforcing member below said circumferential slot and in conjunction with the bottom of said cylindrical nozzle to form a seat for said resilient means, said reinforcing member extending below said bearing surface to form a closure for the L-shaped holes in said tubular container.

References Cited in the file of this patent

UNITED STATES PATENTS

| | | |
|---|---|---|
| 803,127 | Palmer | Oct. 31, 1905 |
| 1,083,552 | McCord | Jan. 6, 1914 |
| 1,279,935 | Sweat | Sept. 24, 1918 |
| 1,745,383 | Rogers | Feb. 4, 1930 |
| 2,831,806 | Wigner | Apr. 22, 1958 |
| 2,905,338 | Koch | Sept. 22, 1959 |
| 2,938,848 | Ladd et al. | May 31, 1960 |

OTHER REFERENCES

International Conference on Peaceful Uses of Atomic Energy, vol. 3, 1955, pages 211–242.

Nucleonics, April 1958, insert on PWR description.

UNITED STATES PATENT OFFICE
CERTIFICATE OF CORRECTION

Patent No. 3,169,097

February 9, 1965

Gilbert W. Meyers

It is hereby certified that error appears in the above numbered patent requiring correction and that the said Letters Patent should read as corrected below.

Column 7, line 9, for "though" read -- through --; column 10, line 7, for "1,745,383" read -- 1,745,382 --; same column 10, after line 15, insert the following:

2nd Geneva Conference on Peaceful Uses of Atomic Energy, vol. 6, 1958, page 635.

Signed and sealed this 28th day of December 1965.

(SEAL)
Attest:

ERNEST W. SWIDER
Attesting Officer

EDWARD J. BRENNER
Commissioner of Patents